Figure 1:
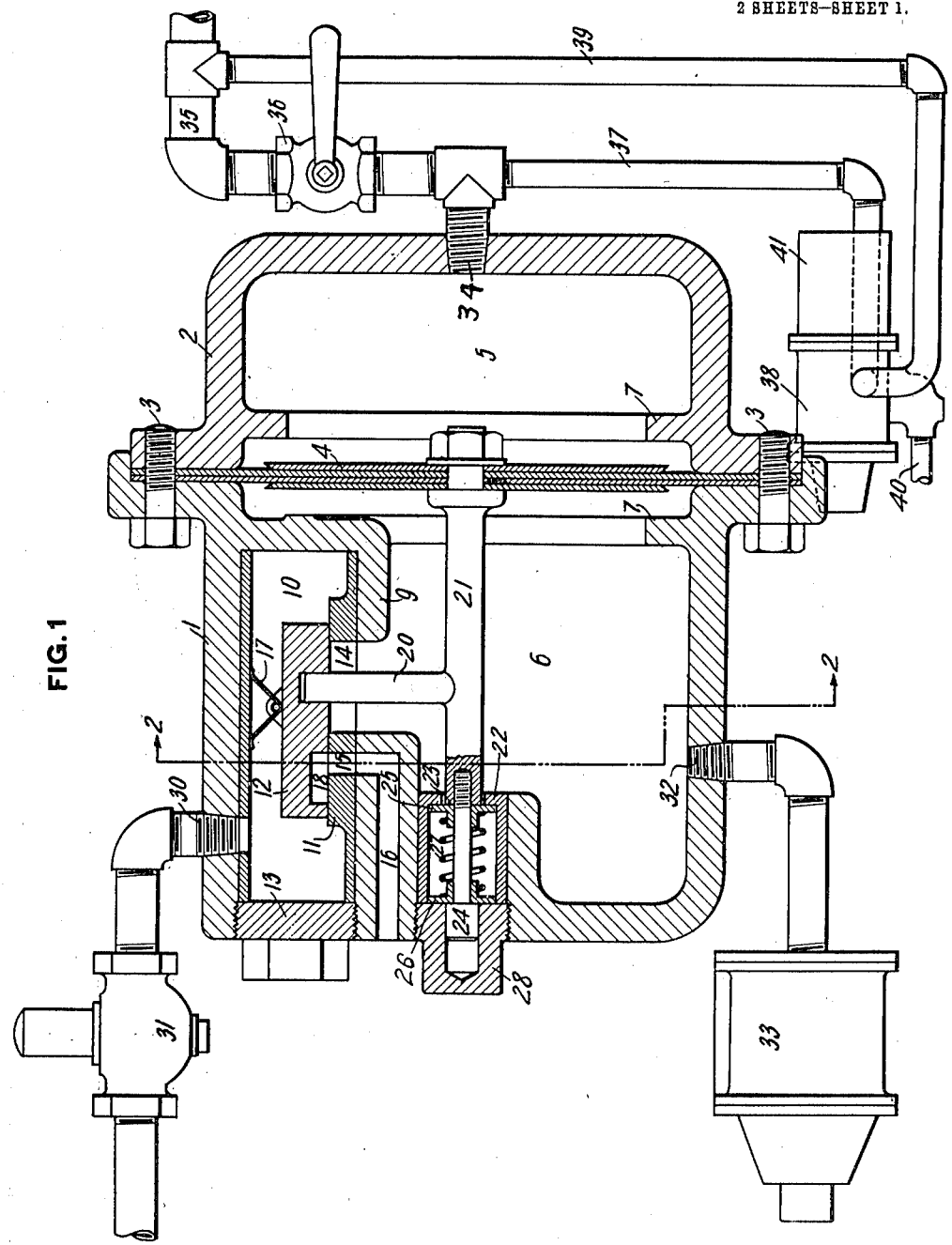

J. R. SNYDER.
ENGINE BRAKE APPLICATION AND MAINTENANCE VALVE.
APPLICATION FILED JULY 11, 1912.

1,064,021.

Patented June 10, 1913.

2 SHEETS—SHEET 1.

WITNESSES

INVENTOR

J. R. SNYDER.
ENGINE BRAKE APPLICATION AND MAINTENANCE VALVE.
APPLICATION FILED JULY 11, 1912.
1,064,021.
Patented June 10, 1913.
2 SHEETS—SHEET 2.
FIG. 2
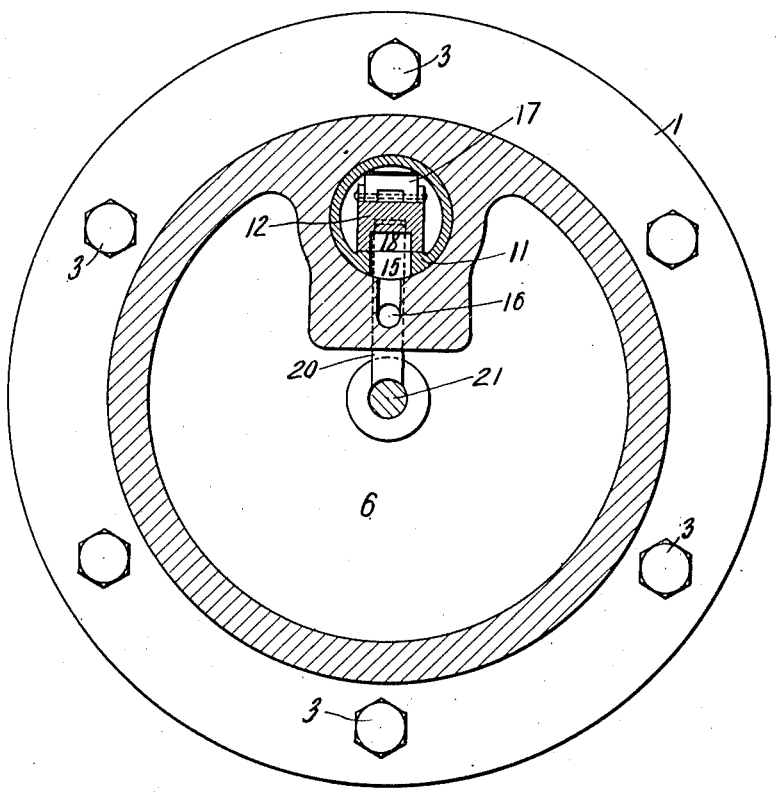
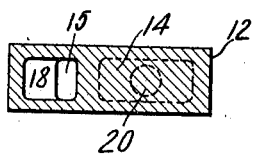
FIG. 3
FIG. 4
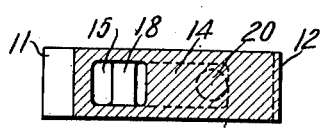
FIG. 5
WITNESSES
INVENTOR

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

ENGINE-BRAKE APPLICATION AND MAINTENANCE VALVE.

1,064,021. Specification of Letters Patent. Patented June 10, 1913.

Application filed July 11, 1912. Serial No. 708,914.

*To all whom it may concern:*

Be it known that I, JACOB RUSH SNYDER, a resident of Pittsburgh, in the county of Allegheny and State of Pennsylvania, have invented a new and useful Improvement in Engine-Brake Application and Maintenance Valves, of which the following is a specification.

This invention relates to air brakes and more particularly to a valve to be installed on an engine and serving to apply and release the engine and tender brakes and also to maintain the pressure therein against leakage and to secure uniform brake cylinder pressure irrespective of the travel of the piston.

The invention comprises the several parts of an air brake system constructed, arranged and connected as hereinafter described and claimed.

In the accompanying drawings, Figure 1 is a sectional view through the special application and maintenance valve and showing diagrammatically connected thereto the other coöperating parts of the system; Fig. 2 is a transverse section on the line 2—2, Fig. 1; and Figs. 3, 4 and 5 are horizontal sectional views through the slide valve, with the valve seat in plan, showing the different positions of the valve.

The special brake cylinder application and maintenance valve comprises a suitable casing preferably formed, as shown, of two members 1 and 2 suitably united, such as by means of bolts 3. The interior of this casing is divided by a suitable abutment,—shown as a diapharagm 4, but which may be a piston,—into two chambers 5 and 6. Suitable stops 7 are provided for limiting the movement of the diaphragm 4 in both directions. A portion of chamber 6 is divided off by the wall or partition 9 forming a bore 10 in which is a valve seat 11 on which operates slide valve 12, the outer end of said bore being closed by plug 13. In the partition or wall 9 and seat 11 is a large port or opening 14 affording communication between bore 10 and chamber 6, and a smaller port or opening 15 communicating with a longitudinal passage 16 leading to the atmosphere. The slide valve 12 is held to the seat by spring 17 and is provided with a single cavity 18 arranged in release or exhaust position, shown in Fig. 5, to connect ports 14 and 15 in the valve seat. The valve 12 is actuated from piston 4 by means of an arm 20 projecting from stem 21 of said piston and projecting through the port or opening 14 and engaging the valve 12. The end of piston stem 21 projects into a suitable sleeve or housing 22 and is provided with a pair of shoulders or collars 23 and 24 between which are a pair of followers or washers 25 and 26 through which the reduced part of the valve stem is slidable and between which followers is interposed a helical spring 27. This spring serves to bring the diaphragm 4 to its normal position, as shown in Fig. 1, but allows the same to move in either direction, as will be readily apparent. The sleeve 22 is closed at its outer end by plug 28 threaded into the end of the valve casing.

The valve chamber 10 has a connection at 30 with the main reservoir by way of reducing valve 31. Chamber 6 has a connection at 32 with the engine brake cylinder 33. Chamber 5 has a connection at 34 with a pipe 35 leading to the engineer's brake valve and in which is placed a suitable cut-off cock 36. The pipe 35 also has a connection 37 leading to the application port of a suitable triple valve 38, and another connection 39 with the exhaust port of said triple valve. The triple valve 38 has the usual train pipe connection 40, and has also connected thereto an auxiliary reservoir 41 which, however, need be of only very limited size as compared with the auxiliary reservoirs usually employed. The pipe 39 connects with pipe 35 on the engineer's brake valve side of cut-out cock 36, while pipe 37 connects with pipe 35 on the opposite side of said cut-off cock.

The operation of the mechanism described is as follows: Figs. 1 and 3 show the special valve in lap or holding position. In this position communication between the main reservoir and brake cylinder is interrupted, and the exhaust port 15 is also lapped, the diaphragm 4 being in neutral position. In this position the pressures on opposite sides of the piston are balanced. We will assume that the engine is a leading engine. If the engineer desires to apply the engine and tender brakes he admits air through pipe 35 into chamber 5, thus moving the diaphragm 4 to the left against the resistance of spring 27 until valve 12 uncovers port 14 (Fig. 4). This allows main reservoir pressure to flow from connection 30 through port 14 and chamber 6 to the brake cylinder 33. As soon as the pressure in the brake cylinder and in chamber 6 balances the pressure in chamber 5, the spring 27 returns abutment 4 and valve 12 to normal position. Consequently, the engineer can apply the engine brakes with any desired degree of pressure by merely admitting to chamber 5 an amount of pressure equal to that desired in the brake cylinder, and as soon as this pressure has been reached in the brake cylinder the valve automatically laps the connection between the main reservoir and the brake cylinder. Should the brake cylinder leak and the pressure therein be materially reduced, the preponderating pressure in chamber 5 again moves the diaphragm and valve to the left to admit more air from the main reservoir to the brake cylinder, until the pressure in the latter again balances the pressure in chamber 5, when the connection will again be lapped. Consequently, the valve not only applies the brakes but also maintains the brake cylinder against leakage.

When it is desired to graduate off or entirely release the brakes the engineer exhausts the pressure from chamber 5, proportionately permitting piston 4 to move to the right under brake cylinder pressure in chamber 6, and compressing spring 27. This moves the valve 12 to the position shown in Fig. 5, wherein the cavity 18 connects ports 14 and 15, thereby exhausting brake cylinder pressure to the atmosphere. As soon as the brake cylinder is exhausted to the degree that the pressures on the opposite side of piston 4 equalize, the spring 27 moves the piston and valve back to normal or lapped position.

We will now assume that the engine is a second or subsequent engine in a multiple header. Under this condition of service the triple valve 38 is connected to train pipe 40, cut-out cock 36 is closed, and the engineer's brake valve is set in running position so as to connect pipe 35 to the atmosphere. The brakes are applied from the leading engine in the usual manner by reducing train pipe pressure, and are released by increasing train pipe pressure. Reduction of train pipe pressure causes the triple valve 38 to move to application position, thereby permitting air from auxiliary reservoir 41 to flow through pipe 37 and connection 34 to chamber 5, and the engine brakes are applied in the same manner as when air was supplied to chamber 5 directly through pipe 35. The auxiliary reservoir 41 need be only large enough to supply chamber 5 with the maximum amount of pressure desired in the brake cylinder, and since chamber 5 is relatively small it requires only a relatively small auxiliary reservoir. Should the brake cylinder leak, the pressure therein will be replenished in the same manner as hereinbefore described.

When it is desired to release the brakes, the increase in train pipe pressure moves the triple valve to exhaust position, thereby exhausting pressure from chamber 5 through pipe 37, triple valve 38 and pipe 39 to the engineer's brake valve. The exhaustion of air from chamber 5 causes the piston to move to the right and releases the brakes in the same manner as hereinbefore described.

It will be understood that the triple valve, auxiliary reservoir and brake cylinder are merely shown in miniature in Fig. 1. The special valve described, therefore, provides for the application of the brakes either by air admitted directly from the engineer's brake valve into chamber 5, or by air admitted into said chamber automatically from auxiliary reservoir 41 by means of triple valve 38 when the pressure of train pipe 40 is reduced, and for the release of brakes from either of said sources, and also serves to maintain brake cylinder pressure against leakage under both conditions of operation. While in one sense it serves the purpose of a triple valve, it lacks that function of a triple valve which supplies air from the train pipe to the reservoir which in application position of the valve supplies the brake cylinder, and has a function not possessed by a triple valve, to-wit, the maintenance of brake cylinder pressure against leakage.

What I claim is:—

1. An air brake valve comprising a casing, a movable abutment therein dividing the same into two chambers, a connection to one side of said abutment arranged for the admission of pressure thereto and exhaustion of pressure therefrom, a brake cylinder normally open to the other side of said abutment, and a single valve controlled by said abutment and controlling communication between a source of fluid pressure and the brake cylinder and between the brake cylinder and the atmosphere.

2. An air brake valve comprising a casing, a movable abutment therein dividing the same into two chambers, a connection to the casing on one side of said abutment arranged for the admission of pressure thereto and exhaustion of pressure therefrom to actuate said abutment, a brake cylinder normally open to the chamber on the opposite side of said abutment, and a single slide valve actuated from said abutment and controlling a connection between the brake cylinder and a source of pressure and between the brake cylinder and the atmosphere.

3. An air brake valve comprising a casing, a movable abutment therein dividing the same into two chambers, a connection to one side of said abutment arranged for the admission of pressure thereto and exhaustion of pressure therefrom, a brake cylinder connected to the other side of said abutment, a single valve controlled by said abutment and controlling communication between a source of fluid pressure and the brake cylinder and between the brake cylinder and the atmosphere, and spring mechanism arranged to return said abutment and valve to neutral position upon equalization of pressures on opposite sides thereof.

4. An air brake valve comprising a casing, a movable abutment therein dividing the same into two chambers, a connection to the casing on one side of said abutment arranged for the admission of pressure thereto and exhaustion of pressure therefrom to actuate said abutment, a brake cylinder connected to the chamber on the opposite side of said abutment, a single slide valve actuated from said abutment and controlling a connection between the brake cylinder and a source of pressure and between the brake cylinder and the atmosphere, and spring mechanism arranged to return said abutment and valve to neutral position upon equalization of pressures on opposite sides thereof.

5. An air brake valve comprising a casing, a movable abutment therein dividing the same into two chambers, a connection to one side of said abutment arranged for the admission of pressure thereto and exhaustion of pressure therefrom, a brake cylinder connected to the other side of said abutment, and a single valve controlled by said abutment and controlling communication between a source of fluid pressure and the brake cylinder and between the brake cylinder and the atmosphere, said valve being arranged to blank the connection between the brake cylinder and source of fluid pressure and between the brake cylinder and the atmosphere upon equalization of pressures on opposite sides of said abutment.

6. An air brake valve comprising a casing, a movable abutment therein dividing the same into two chambers, a connection to the casing on one side of said abutment arranged for the admission of pressure thereto and exhaustion of pressure therefrom to actuate said abutment, a brake cylinder connected to the chamber on the opposite side of said abutment, a single slide valve actuated from said abutment and controlling a connection between the brake cylinder and a source of pressure and between the brake cylinder and the atmosphere, said valve being arranged to blank the connection between the brake cylinder and source of fluid pressure and between the brake cylinder and the atmosphere upon equalization of pressures on opposite sides of said abutment.

In testimony whereof I have hereunto set my hand.

JACOB RUSH SNYDER.

Witnesses:
F. W. WINTER,
WILLIAM B. WHARTON.